US012413883B2

(12) United States Patent
Schuster et al.

(10) Patent No.: US 12,413,883 B2
(45) Date of Patent: Sep. 9, 2025

(54) SPEAKER WITH BATCHED CONES

(71) Applicant: Harman Becker Automotive Systems GmbH, Karlsbad (DE)

(72) Inventors: Michael Schuster, Munich (DE); Philipp Goeppl, Eresing (DE); Andreas Helmut Pfeffer, Wenzenbach (DE); Stefan Erhard Dorr, Olching (DE)

(73) Assignee: Harman Becker Automotive Systems GmbH, Karlsbad-Ittersbach (DE)

( * ) Notice: Subject to any disclaimer, the term of this patent is extended or adjusted under 35 U.S.C. 154(b) by 240 days.

(21) Appl. No.: 18/349,879

(22) Filed: Jul. 10, 2023

(65) Prior Publication Data

US 2025/0024182 A1 Jan. 16, 2025

(51) Int. Cl.
*H04R 1/02* (2006.01)

(52) U.S. Cl.
CPC ......... *H04R 1/025* (2013.01); *H04R 2201/02* (2013.01); *H04R 2400/11* (2013.01)

(58) Field of Classification Search
CPC H04R 1/025; H04R 2201/02; H04R 2400/11; H04R 9/043; H04R 9/063; H04R 9/06; H04R 9/02
See application file for complete search history.

(56) References Cited

U.S. PATENT DOCUMENTS 4,039,044 A * 8/1977 Heil ........................ H04R 9/063 381/186
4,107,479 A * 8/1978 Heil ........................ H04R 9/063 181/173
4,908,601 A * 3/1990 Howze ................. G10K 11/025 381/387
5,146,508 A * 9/1992 Bader ...................... G10K 9/22 381/152
5,164,549 A * 11/1992 Wolf ...................... H04R 1/227 181/147
6,335,975 B1 * 1/2002 Yang ........................ H04R 5/02 381/386
8,897,472 B2 * 11/2014 Unruh .................... H04R 9/063 381/186
9,462,388 B2 * 10/2016 Unruh ...................... H04R 7/08
2010/0239101 A1 * 9/2010 Okamura ................. H04R 3/00 381/94.1
2011/0216926 A1 * 9/2011 Riggs ........................ H04R 3/12 381/300
2017/0013366 A1 * 1/2017 Lee ...................... H04R 1/2896
2021/0227330 A1 * 7/2021 Cho ........................ H04R 1/403
2024/0114287 A1 * 4/2024 Gahimer ................ H04N 23/57
2024/0223960 A1 * 7/2024 Scheek .................. H04R 9/025

FOREIGN PATENT DOCUMENTS

CN 103888878 A 6/2014
DE 19936411 A1 * 3/2001 ............. H04R 9/063
EP 0771133 A1 * 5/1997 ............... H04R 9/06

* cited by examiner

*Primary Examiner* — Oyesola C Ojo
(74) *Attorney, Agent, or Firm* — Angela M. Brunetti

(57) ABSTRACT

A speaker sub-assembly has at least one active segment base segment, at least one batch segment, and a passive end segment. In one or more embodiments, speaker sub-assemblies with batched cones may be attached to each other by way of an adapter segment to create a dual-core speaker with batched cones. In one or more embodiments, speaker sub-assemblies with batched cones may be assembled in parallel, or linearly end-to-end.

9 Claims, 13 Drawing Sheets

SPEAKER WITH BATCHED CONES

TECHNICAL FIELD

The present disclosure relates to a speaker and more particularly, to a speaker with batched cones.

BACKGROUND

Audio systems in a listening environment typically include speakers that are distributed around the vehicle interior. Premium audio systems often include large subwoofers and dedicated amplifiers. In general, a premium audio system requires a lot of available space in the listening environment and locations within the available space that speakers may be positioned. Configuring an audio system involves selecting speaker locations in the listening environment. For a listening environment with limited space, such as a vehicle cabin, locating speakers, especially low frequency operating speakers such as subwoofers, packaging constraints are challenging. Generation of low frequency needs a large cabin volume and transducer size. Therefore, in automotive scenarios a compromise in cabinet size and in transducer size must be made, which usually limits low-frequency cutoff of the audio system.

Furthermore, a smaller listening environment requires smaller speakers, which inherently are not as efficient in generating midrange and low frequencies as larger speakers. A listener has an expectation for bass performance that may be adversely affected by smaller speakers. Solutions such as psychoacoustic tuning attempt to compensate for reduced bass-performance, but at the expense of clarity and high-fidelity performance.

Another solution is to attempt a more compact speaker design by including passive radiators or using a vented enclosure. However, these solutions have drawbacks of their own. Passive radiators often cause the speaker to move noticeably resulting in unwanted noise. Vented enclosures may expose the speaker to harsh environments. Furthermore, such speaker designs are still subject to the size/location limitations associated with the listening environment, thereby requiring their design be on a case-by-case basis.

There is a need for a transducer assembly in a speaker that, unlike a conventional speaker, is capable of scalable variations in size to accommodate a variety of packaging conditions while maintaining performance.

SUMMARY

A speaker sub-assembly having at least one active segment base segment, at least one batch segment, and a passive end segment. In one or more embodiments, speaker sub-assemblies with batched cones may be attached to each other by way of an adapter segment to create a dual-core speaker with batched cones. In one or more embodiments, speaker sub-assemblies with batched cones may be assembled in parallel, or linearly end-to-end.

In one or more embodiments, a scalable speaker assembly has at least one electrically driven base segment having a motor and a voice coil driven by the motor, a passive end segment having a cone driven by the at least one electrically driven base segment, and a plurality of passive batch segments connected between the at least one electrically driven base segment and the passive end segment, each batch segment in the plurality of batch segments is stacked to provide an overall cone area for the scalable speaker assembly. In one or more embodiments, two scalable speaker assemblies may be attached to each other by way of an adapter segment to create a dual-core speaker with batched cones. In one or more embodiments, a plurality of dual-core speakers may be assembled to each other in parallel, or linearly end-to-end.

Elements and steps in the figures are illustrated for simplicity and clarity and have not necessarily been rendered according to any sequence. For example, steps that may be performed concurrently or in different order are illustrated in the figures to help to improve understanding of embodiments of the present disclosure.

DETAILED DESCRIPTION

While various aspects of the present disclosure are described with reference to FIGS. 1-16, the present disclosure is not limited to such embodiments, and additional modifications, applications, and embodiments may be implemented without departing from the present disclosure. In the figures, reference numbers will be used to illustrate the same components. Those skilled in the art will recognize that the various components set forth herein may be altered without varying from the scope of the present disclosure.

Figure 1:
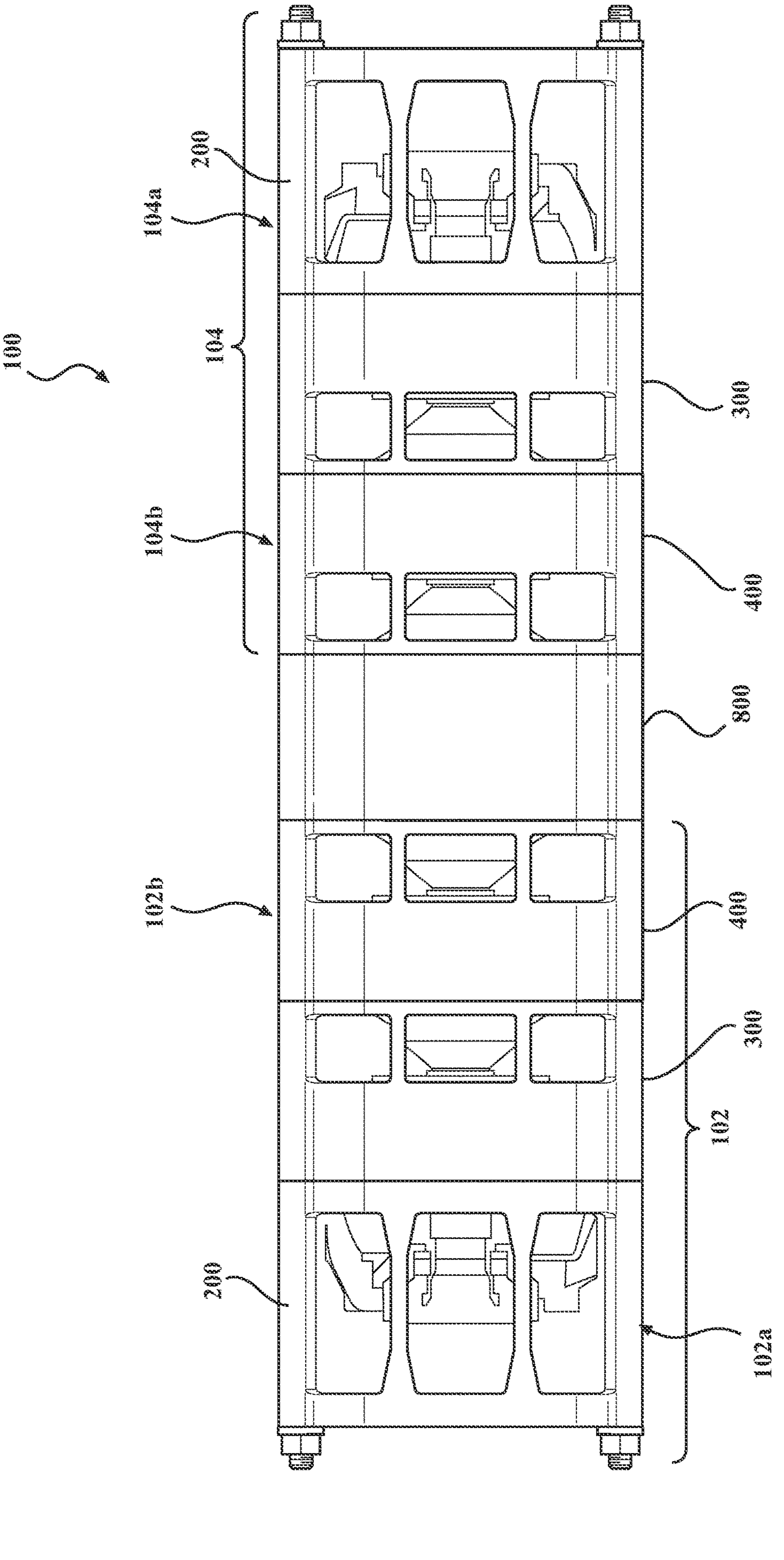
FIG. 1. is a front view of one or more embodiments having two scalable speakers with batched cones attached at a passive end segment of each speaker with batched cones.

FIG. 1 is a perspective view of one or more embodiments of a scalable speaker with batched cones assembly 100. The scalable speaker with batched cones assembly 100 has at least one base segment 200, one or more batch segments 300, and an end segment 400. Each speaker with batched cones assembly 100 is scalable through the number and combination of base, batch, and end segments that are used in the assembly. In the embodiment shown in FIG. 1, two scalable speakers with batched cones assemblies 102 and 104 may be attached to each other with an optional adapter segment 800.

In-vehicle applications typically have packaging requirements that require an assembly be as small as possible, yet a listener's expectation of bass-performance remains high. The scalable speaker with batched cones assembly 100 of the inventive subject matter presents many more options for integrating the speaker 100 within the vehicle cabin, using little packaging space while maintaining bass-performance that meets, or exceeds, the listener's expectation. For example, one or more scalable speakers with batched cones assemblies 100 may be placed below a rear seat in the vehicle cabin where it uses a cavity below the rear seat as working volume. Using a subwoofer with a conventional speaker in this location is nearly impossible due to subwoofer size. However, the scalable speaker with batched cones assembly can accommodate a plurality of batch segments to provide more cone area. By stacking the radiating area of multiple cones over each other, the assembly maintains an overall effective cone surface for a compact assembly allowing it to be packaged into a smaller space without limiting sensitivity or efficiency. Furthermore, the scalability of the batched segments makes the design customizable across different applications, limited only by the size of the location within which the speaker with batched cones assembly will be installed.

One or more embodiments of a scalable speaker with batched cones assembly 100 is shown in FIG. 1. The assembly 100 has at least one of first and second subassemblies, i.e., scalable speakers 102, 104. In an example arrangement shown in FIG. 1, two sub-assemblies 102, 104 with batched cones are arranged facing each other. Each speaker sub-assembly 102, 104 has an active end with at least one active segment **102*a*, 104*a* at the base segment 200, at least one batch segment 300, and a passive end 102*b*, 104*b* at the end segment 400. In one or more embodiments, the first scalable speaker with batched cones 102 is connected at the passive end 102*b* with the passive end 104*b* of the second scalable speaker with batched cones 102 by way of the optional adapter segment 800 to configure the speaker as a dual-core speaker with batched cones assembly 100. However, it should be noted that it is not required that scalable speakers with batched cones 102, 104 be connected as shown and that one of the first 102 or second 104 scalable speakers with batched cones may be a standalone unit. It should be noted that the speaker with batched cones 102, 104 unit may have fewer, or more, batch segments than what is shown in FIG. 2**.

It should be noted that assembly 100 may include several scalable speakers with batched cones 102 and 104 arranged in a row within the same enclosure. It should also be noted that the assembly 100 may include more active elements (base segments 200) stacked on top of each other, resulting in a summing of a motor force of each base segment 200.

Figure 2A:
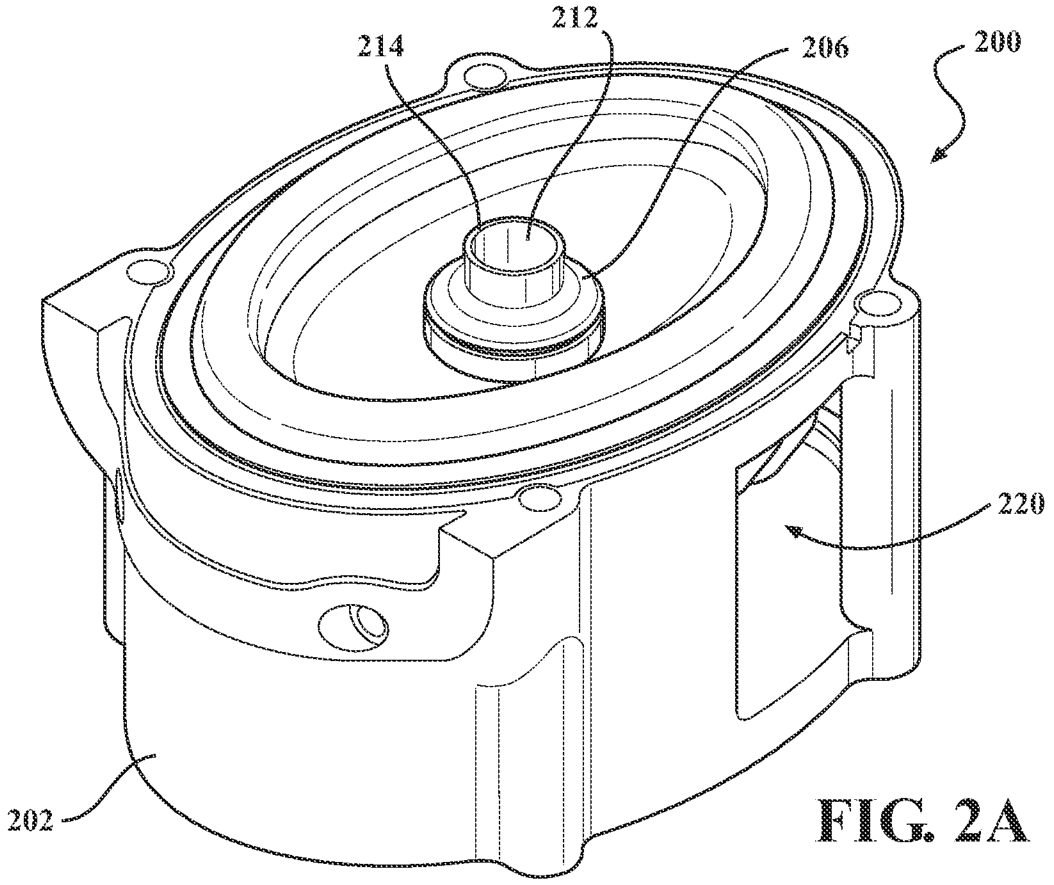
FIG. 2A is a perspective view of a base segment of a scalable speaker with batched cones.
Figure 2B:
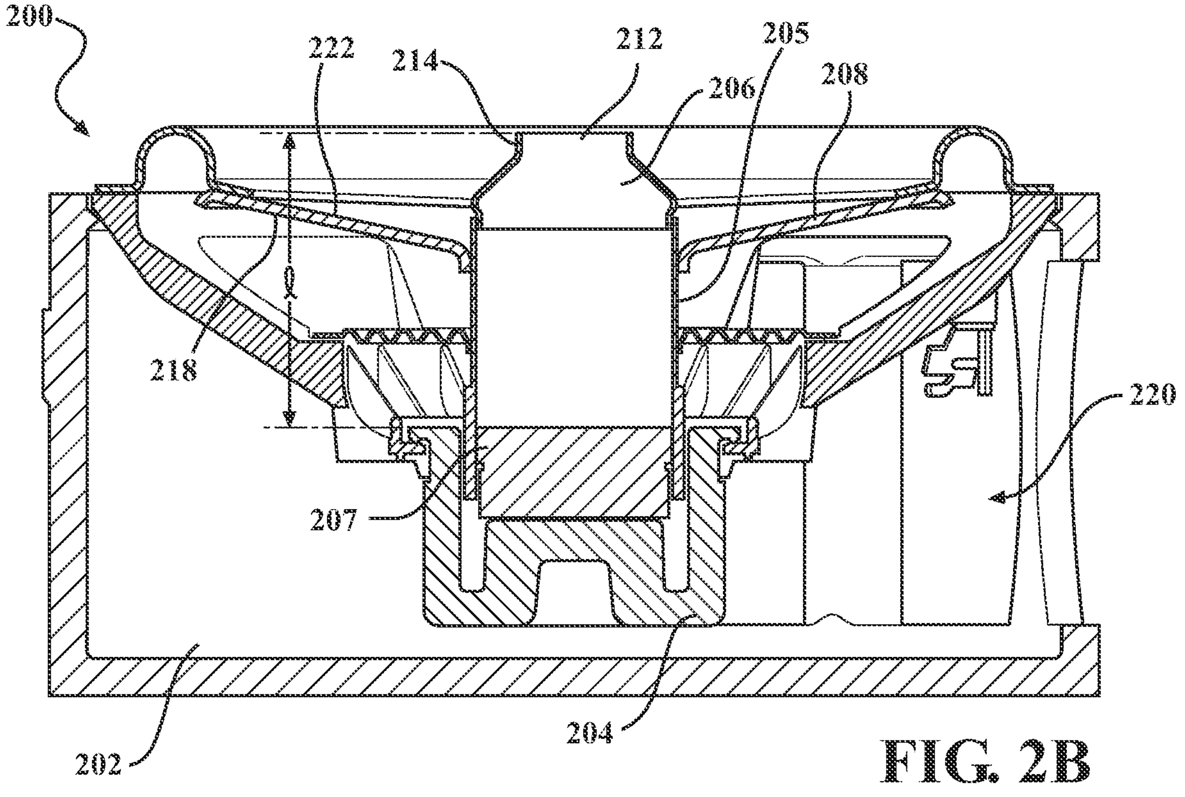
FIG. 2B is a cross-sectional view of the base segment.

Referring now to FIGS. 2A and 2B, the base segment 200 is described. The base segment 200 is an active unit meaning that it is electrically driven by a motor 204. The motor has a magnet 207 that may be a permanent slug or ring neodymium magnet, or an electromagnet. A perspective view of the base segment 200 is shown in FIG. 2A. A cross-sectional view of the base segment 200 is shown in FIG. 2B. Each base segment 200 has a base enclosure 202 that houses a motor assembly 204, a voice coil 205, a carrier tube 206 or push rod (hereinafter, carrier tube), a cone 208, and a spider 210 (or surround). The carrier tube 206 passes from the voice coil 205 through the cone 208 and spider 210 and provides support for the cone 208. A top end 212 of the carrier tube 206 has a flange 214 for connecting the base segment 200 to a batch segment (not shown in FIG. 2A or 2B). The carrier tube 206 is a predetermined length, l, so that the top (or second) end 212 extends beyond the cone 208 and a top side 216 of the base enclosure 202. The carrier tube 206 may have a flange 214 for connecting to a carrier tube of an adjacent segment (not shown). Further, the carrier tube 206 may be more than one component as shown in FIG. 2B.

In the example shown in FIGS. 2A and 2B, a first side 222 of the cone 208 is coupled to a first resonance volume, such as a vented resonance volume of an adjacent enclosure (i.e., a batch or end segment to be described hereinafter. A second side 218 of the cone 208 couples to a second resonance volume that is different from the first resonance volume, such as a resonance volume of the base enclosure 202. The second side 218 of the cone 208 is coupled to the second resonance volume by way of an opening 220 in the enclosure 202. For example, opening 220 may vent into a vehicle cabin. Coupling front and back radiated signals to different resonance volumes, first and second resonance volumes, prevents acoustic short.

Figure 3A:
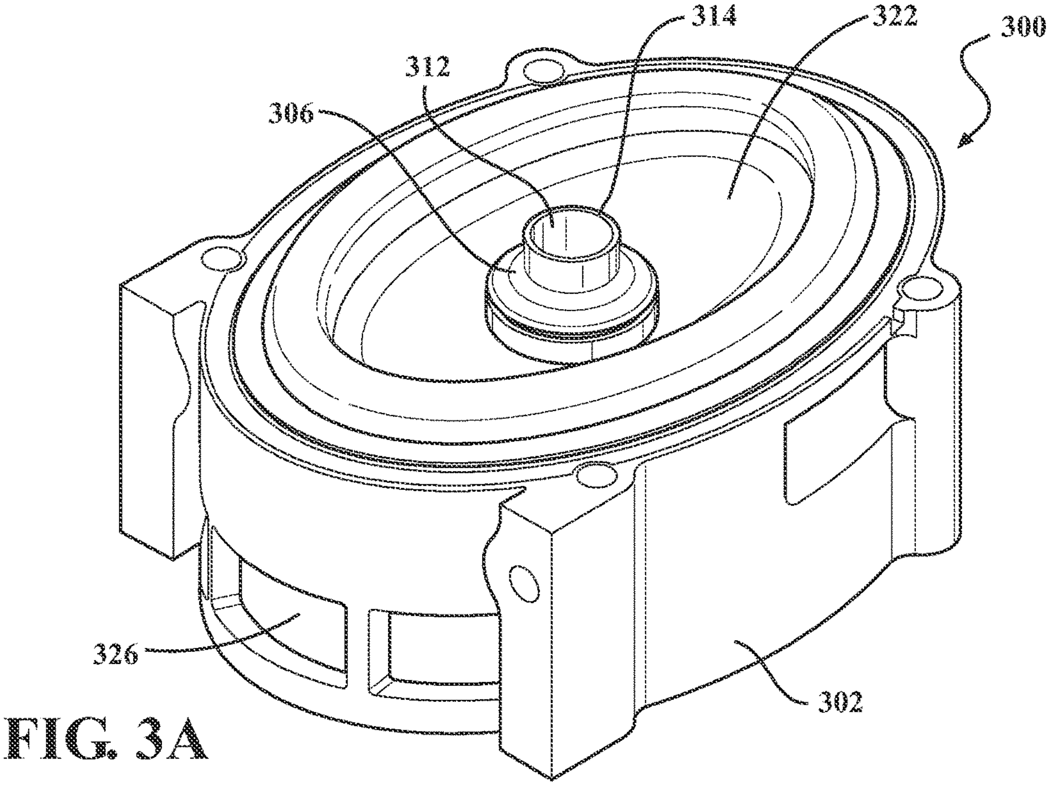
FIG. 3A is a perspective view of a batch segment.
Figure 3B:
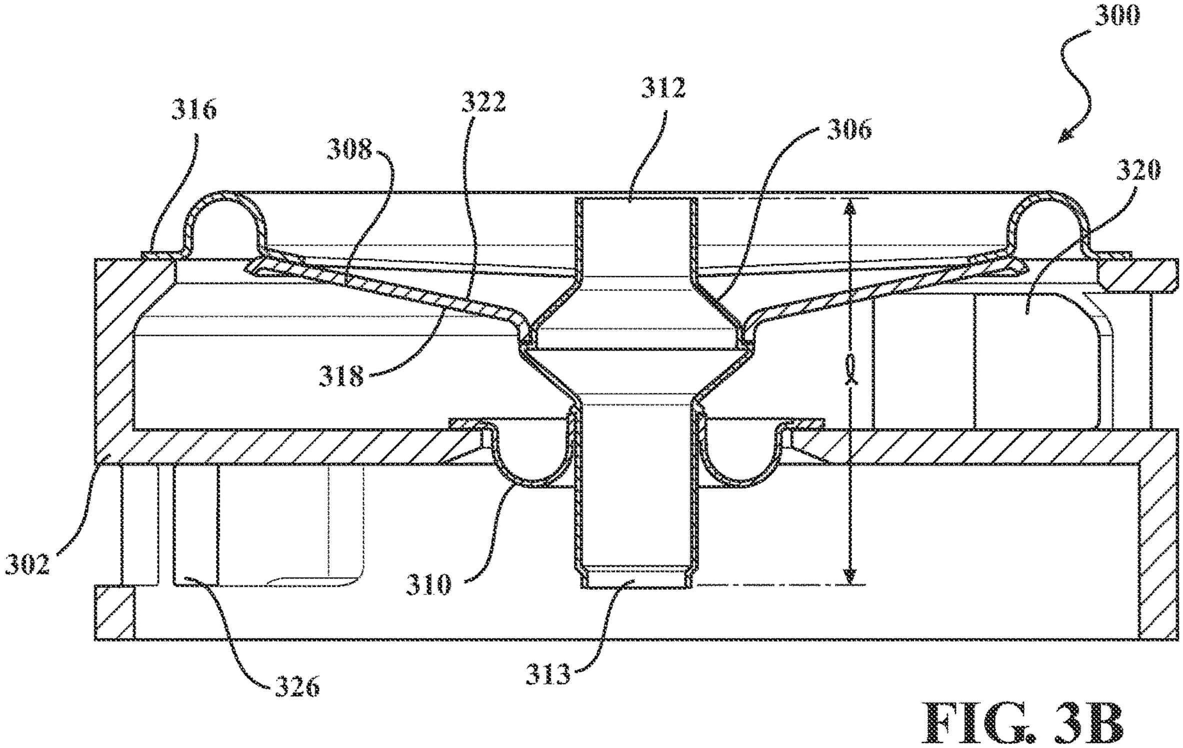
FIG. 3B is a cross-sectional view of the batch segment.

Each batch segment 300 is a passive unit of the speaker with batched cones assembly 100. FIG. 3A shows a perspective view of the batch segment 300. FIG. 3B shows a cross-sectional view of the batch segment. The batch segment 300 has a batch segment enclosure 302 that houses a carrier tube 306, a cone 308, and a suspension element 310, such as a spider or surround. The carrier tube 306 passes through the cone 308 and suspension element 310 and provides support during excursion of the cone 308. A top end 312 of the carrier tube 306 has a flange 314 for connecting to a carrier tube of another batch segment 300 or an end segment (not shown in FIG. 3A or 3B). A bottom end 313 of the carrier tube 306 is configured to attach to either the base segment (not shown in FIG. 3A or 3B) or a top end 312 of the carrier tube 306 of another batch segment 300 (also not shown in FIG. 3A or 3B). The carrier tube 306 has a predetermined length 1, so that the top end 312 with the flange 314 extends beyond a top side 316 of the batch segment enclosure 302.

A first side 322 of the cone 308 in the batch 300 segment is coupled to a first resonance volume by way of the enclosure of an adjacent batch or end segment (not shown). The batch enclosure 302 has an opening 320 that couples a second side 318 of the cone 308 of the batch segment to a second resonance volume that differs from the first resonance volume, such as, for example, the vehicle cabin. The enclosure 302 that attaches to the adjacent batch or end segment (not shown) has an opening 326. In one example, the opening 326 provides exposure to a second resonance volume for the first surface 222 of the cone 208 in the base segment 200.

The batch segment 300 is a passive segment. It is mechanically driven by the carrier tube 306 being connected to supporting, and/or centering, the voice coil 208 of the active base segment 200, which is electrically driven by the magnet and the voice coil as described above with reference to FIG. 2B.

Figure 4A:
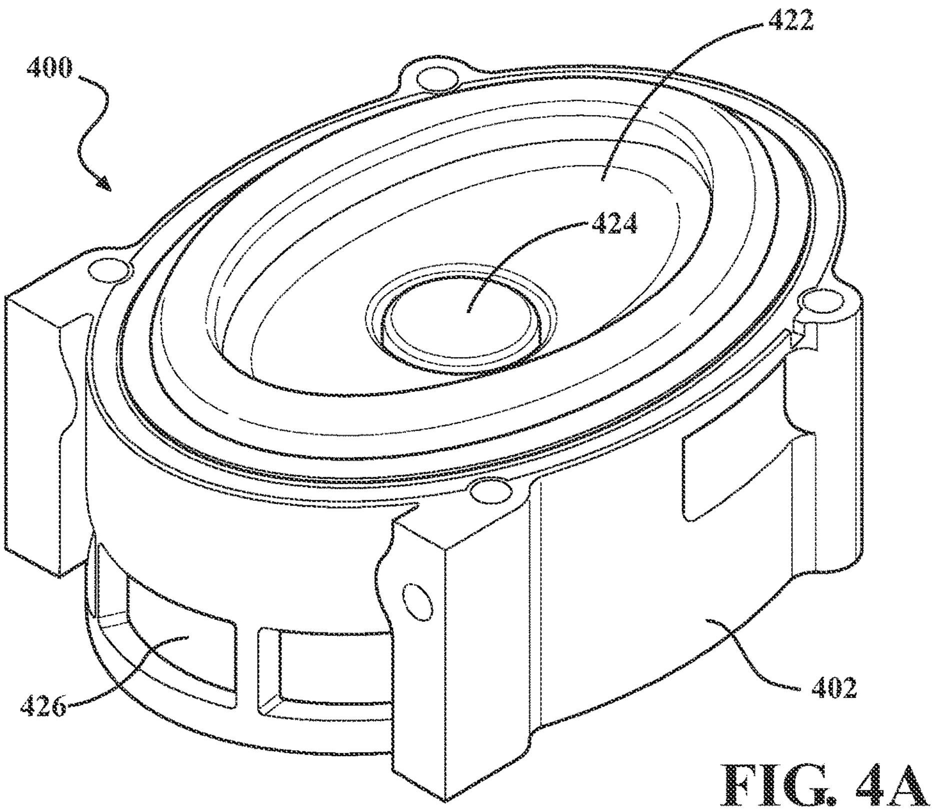
FIG. 4A is a perspective view of an end segment.
Figure 4B:
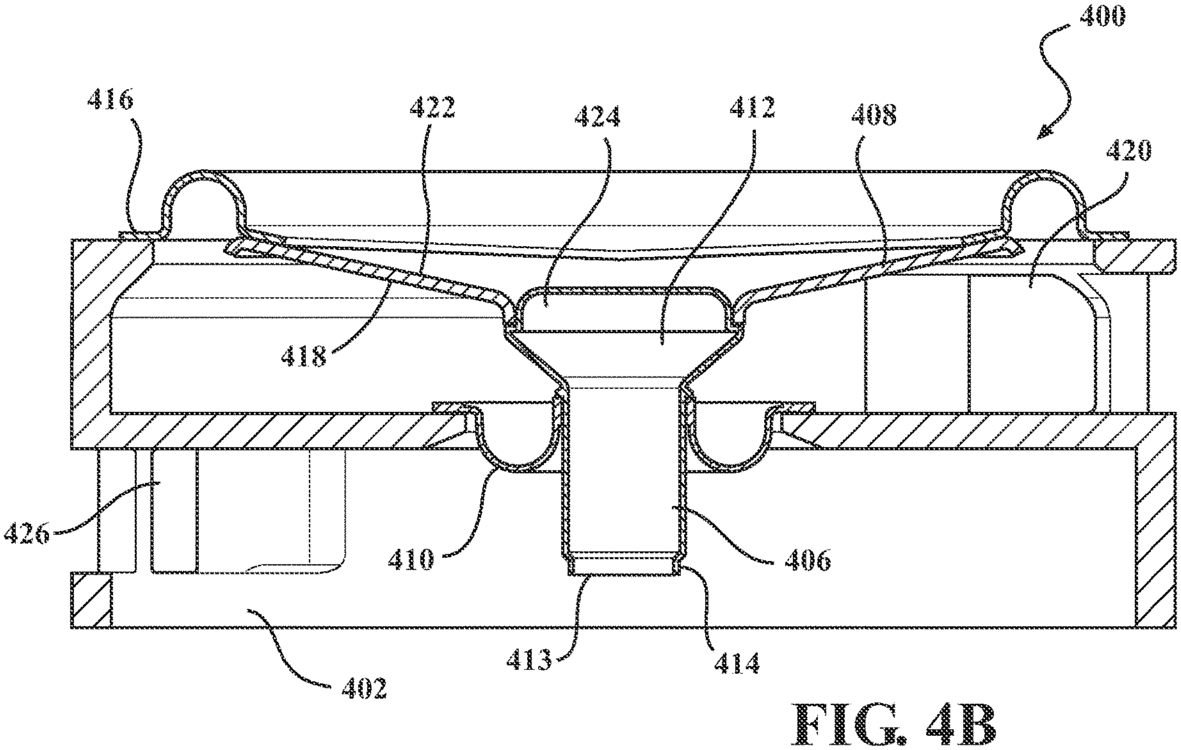
FIG. 4 B is a cross-sectional view of the end segment.

FIG. 4A shows a perspective view of an end segment 400. FIG. 4B shows a cross-sectional view of the end segment 400. The end segment 400 has an end segment enclosure 402 that houses a carrier tube 406, a cone 408, and a spider 410 (or surround). The carrier tube 406 passes through the cone 408 and spider 410 and provides support for the cone 408. A bottom end 413 of the carrier tube 406 has a flange 414 for connecting to a carrier tube of a batch segment 300 (not shown in FIGS. 4A and 4B). A top end 412 of the carrier tube 406 has a dust cap 424. The carrier tube 406 has a predetermined length, l, so that the top end 412 with the dust cap 424 extends beyond a top side 416 of the end segment enclosure 402. A first side 422 of the cone 408 in the end segment 400 is exposed to a resonance volume by way of, for example, an adjacent enclosure (not shown). The batch enclosure 402 has an opening 420 that couples a second side 418 of the cone 408 to a second resonance volume. An opening 426 couples a resonance volume of the first side 222, 322 of the cone 208, 308, of an adjacent segment, either base segment 200 or a batch segment 300.

As described above, there is no motor assembly in the one or more batch segments 300 or the end segment 400. Instead, the batch segments 300, and the end segment 400 are mechanically driven through their connection to the base segment and/or each other. For example, the carrier tube 306 of the batch segments 300 may connect to each other and to the carrier tube 406 in the end segment 400. Ultimately, the passive segments 300, 400 are mechanically driven by use of carrier tubes and/or push rods between each passive segment 300, 400 and the active segment 200 which is electrically driven. This may be done by connecting the cones 308, 408, of each batch and end segment to the carrier tubes 306, 406.

Alternatively, the batch segment 300 and end segment 400 cones 308, 408 may not be connected to the carrier tubes 306, 406. In this example, the segments 300 and 400 behave as passive radiators whose resonance frequency may be tuned by suspension force and weight to extend low-frequency.

The enclosures 202, 302, and 402 may be mechanically fastened to each other. The openings should align. For example, the opening 220 in the base segment enclosure 202 should align with the opening 320 in each of the batch segment enclosures 302, and the opening 420 in the end segment enclosure 402.

Figure 5:
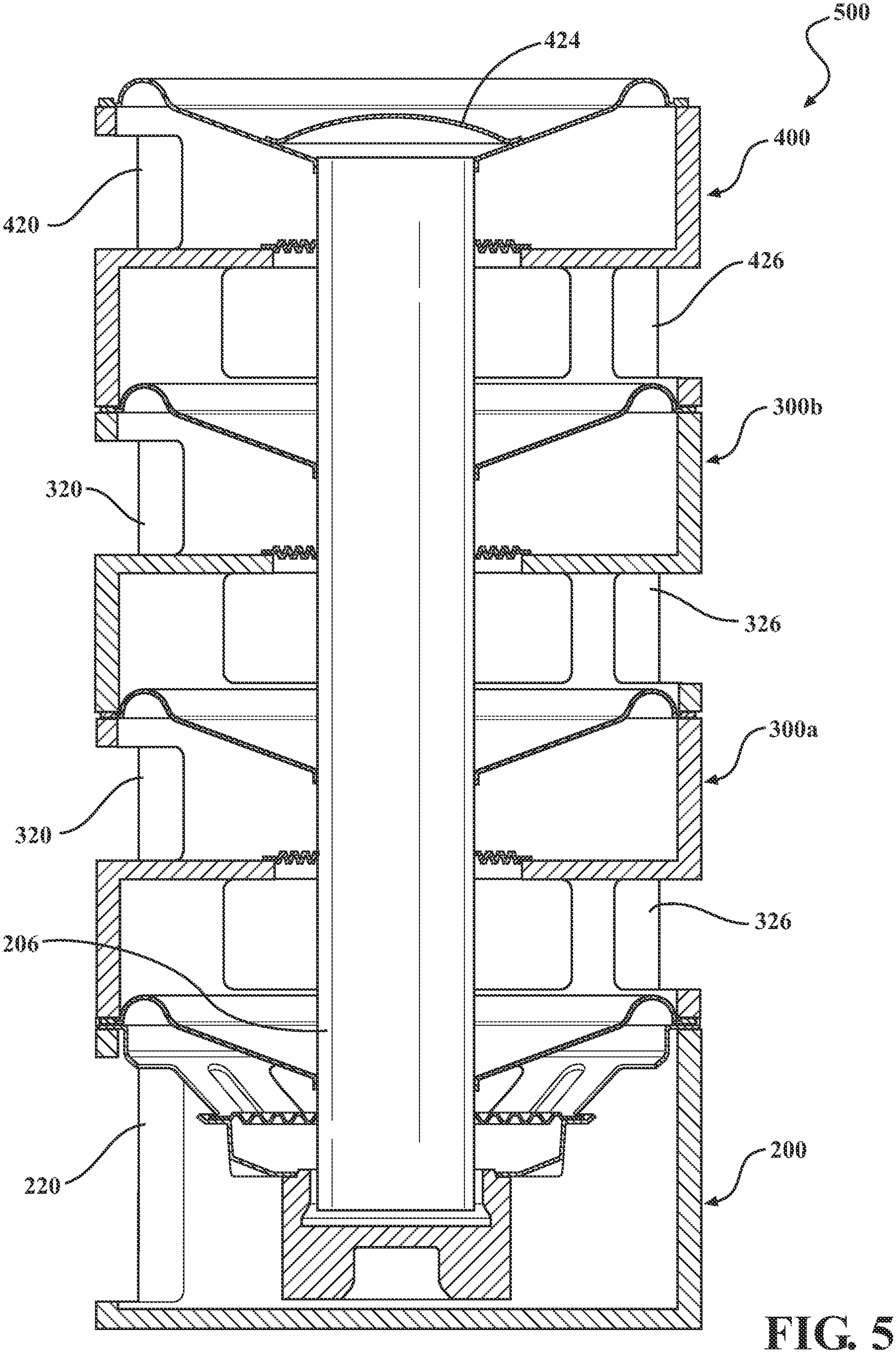
FIG. 5 is a cutaway view of a base segment, two batch segments and an end segment forming a scalable speaker with batched cones.

In one or more embodiments, the speaker with batched cones assembly 500 may include at least one base segment 200 and at least one end segment 400. One or more batch segments 300 may be connected in between a base unit 200 and the segment 400. FIG. 5, for example, shows a cross sectional view of a speaker with batched cones assembly 500 having a base segment 200, first and second batch segments 300*a*, 300*b* attached thereto, and an end segment 400 attached to one of the batch segments 300*b*. The first batch segment 300*a* is attached to the base segment 200, The second batch segment 300*b* is attached to the first batch segment 300*a*, and an end-unit batch segment 400*a* is attached to the second batch segment 300*b*. The number, n, of batch segments 300 is scalable 300*a*-300*n*, and may vary according to packaging constraints, performance considerations, etc. It should be noted that the speaker assembly with batched cones may also have only one base segment 200 and one end unit 400, without intermediate batch segments 300.

In the one or more embodiments shown in FIG. 5, the speaker with batched cones assembly 500 has a carrier tube 206 that is one piece. It should be noted that this is shown for example purposes only, and as described above, it is possible that the carrier tube may be multiple components. In yet another example, the carrier tube may be one or more push rods. The design of the speaker with batched cones assembly having one or more pushrods, or a carrier tube of one or more components may depend upon its specific use in the environment and a packaging location for the assembly.

Figure 6A:
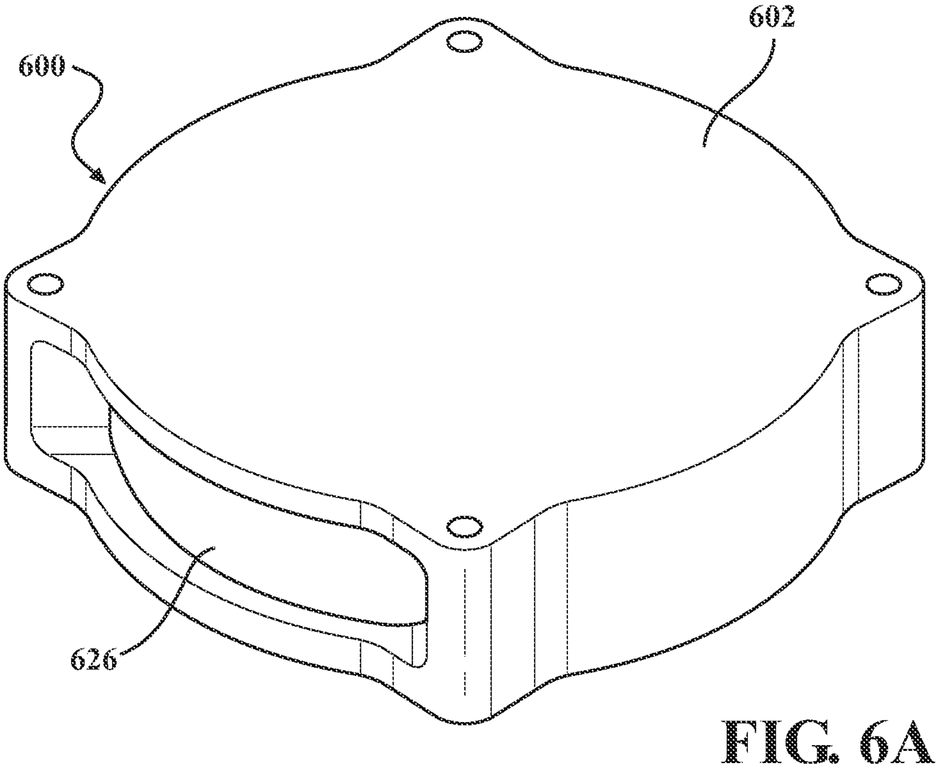
FIG. 6A is a perspective view of a cover segment.
Figure 6B:
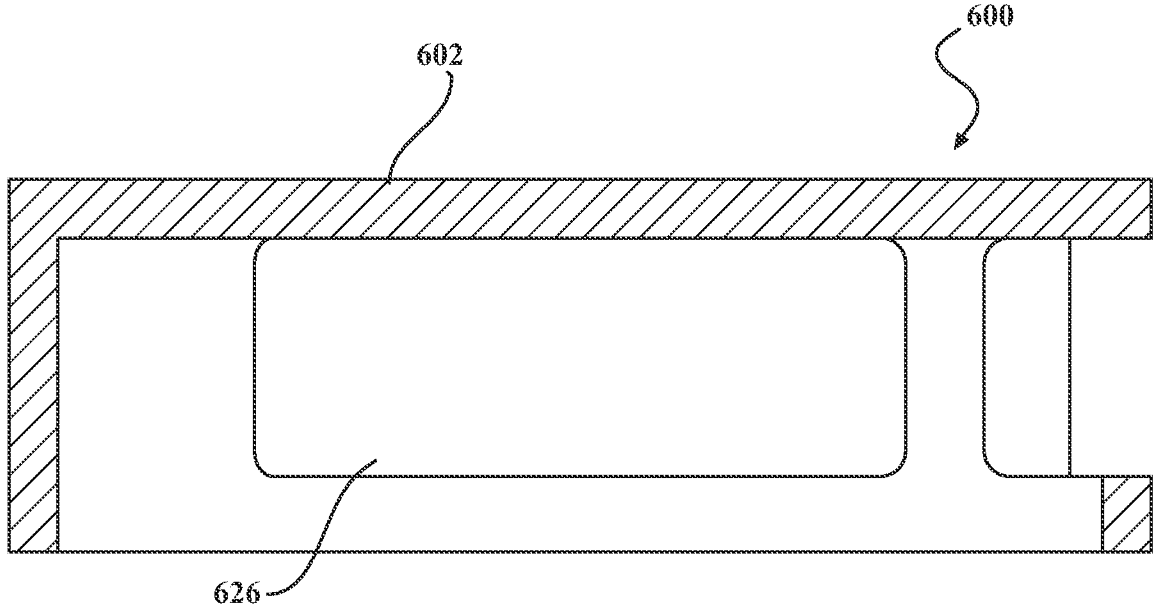
FIG. 6B is a cross-sectional view of the cover segment.

The speaker with batched cones assembly 500 may be standalone. In one or more embodiments of a standalone speaker with batched cones assembly, a cover segment 600 may be attached to the passive end. FIG. 6A shows a perspective view of a cover segment 600. FIG. 6B shows a cutaway view of the cover segment 600. The cover segment 600 has a cover enclosure 602 with an opening 626 that couples to a respective resonance volume, for example the first resonance volume for the first side of the cone of the adjacent segment, which may be a batch segment 300 or an end segment 400, for example.

Figure 7B:
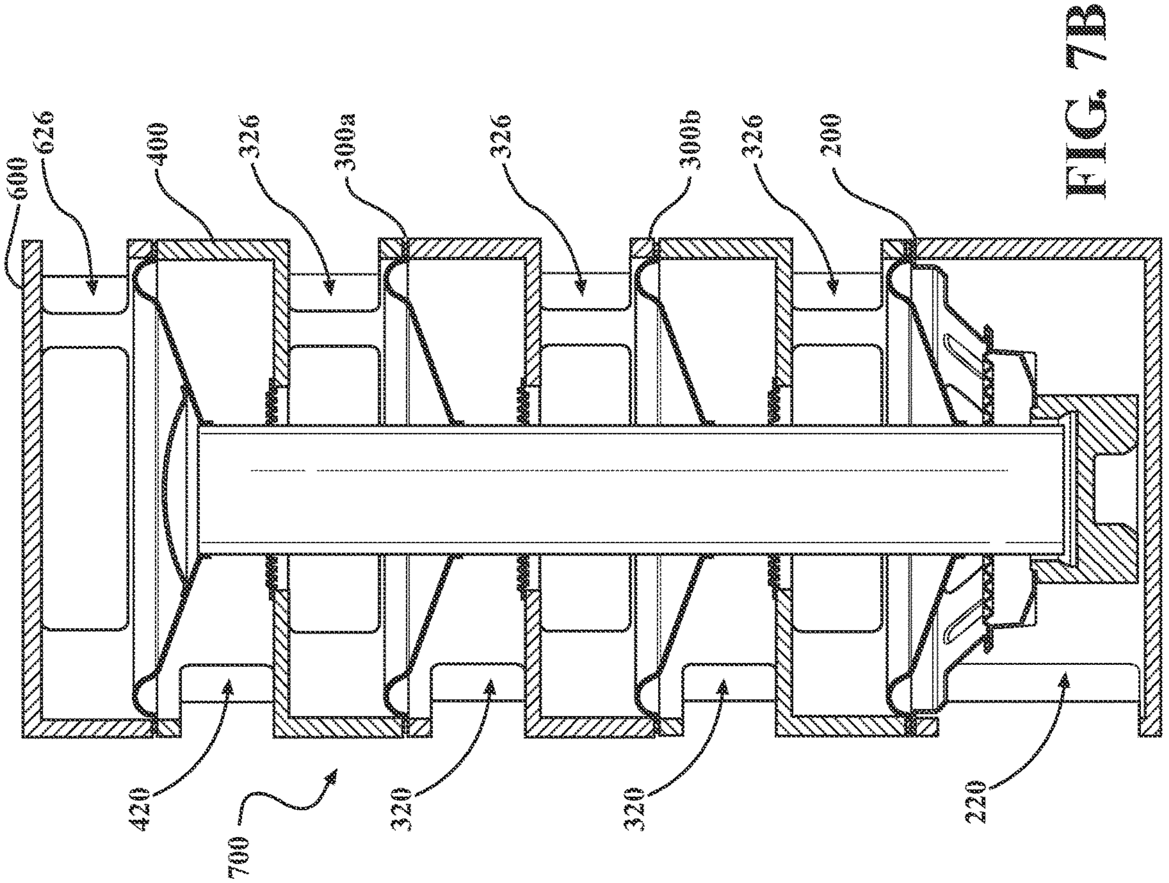
FIG. 7B is a cross-sectional view of the scalable speaker with batched cones of FIG. 7A.
Figure 7A:
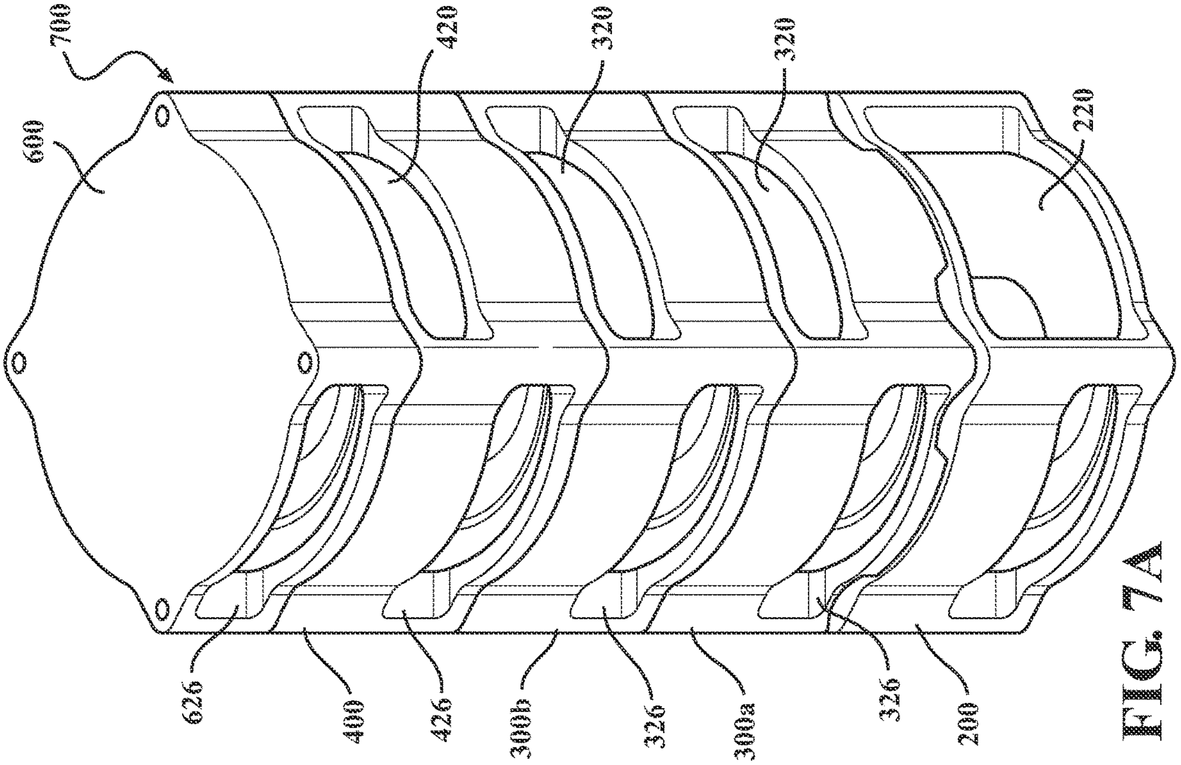
FIG. 7A is a scalable speaker with batched cones having a base segment, two batch segments, an end segment, and a cover segment.

FIG. 7A is a perspective view of one or more embodiments of a speaker with batched cones 700 showing one base segment 200, two batch segments 300*a*, 300*b*, an end segment 400, and a cover segment 600. FIG. 7B is a cross sectional view. A first batch segment 300*a* is attached to the base segment 200, a second batch segment 300*b* is attached to the first batch segment 300*a*. The end segment 400 is attached to the second batch segment 300*b*. In the example shown in FIG. 7, the cover segment 600 attaches to the end segment 400.

Figure 8A:
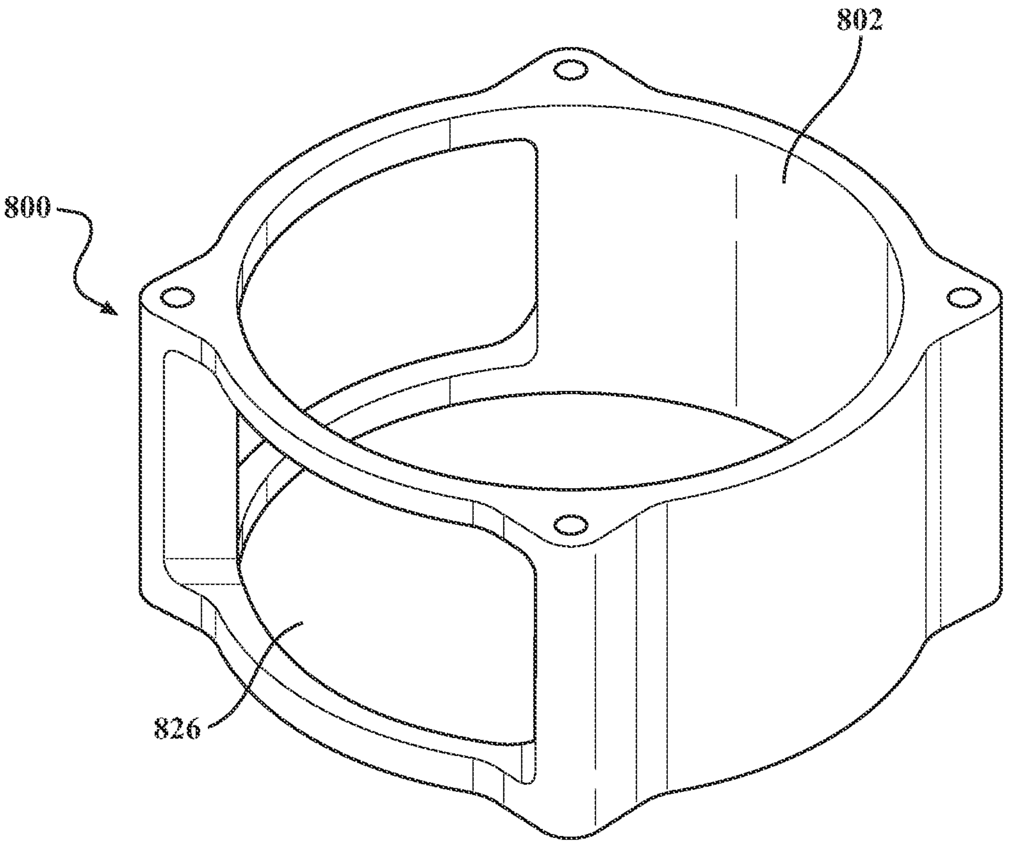
FIG. 8A is a perspective view of an adapter segment.
Figure 8B:
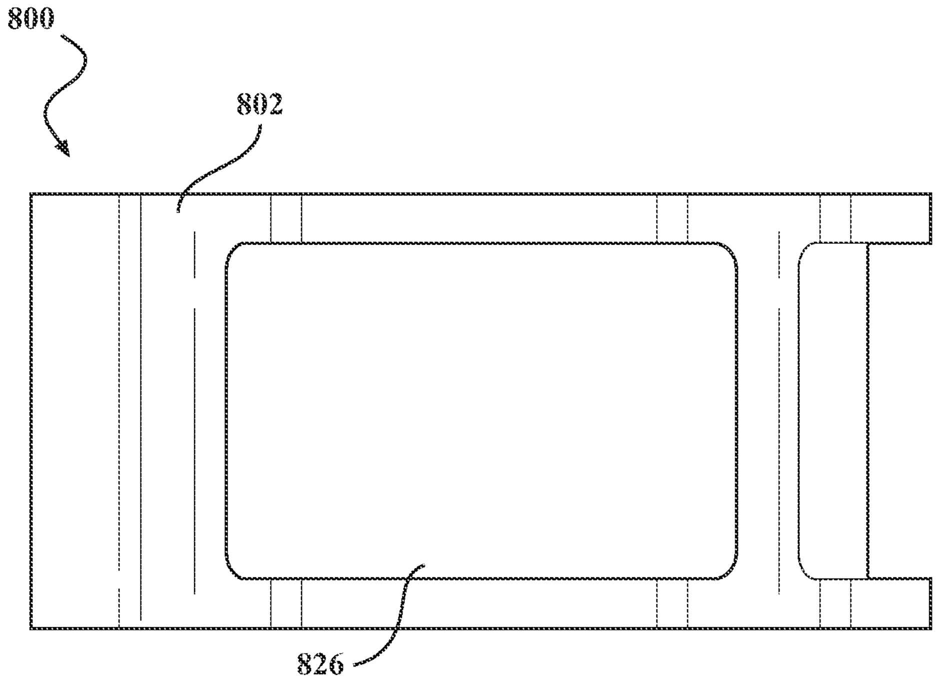
FIG. 8B is a cutaway view of the adapter segment.

As discussed earlier herein, in one or more embodiments, speakers with batched cones 700 may be attached to each other by way of the adapter segment 800 to create a dual-core speaker with batched cones. FIG. 8A is a perspective view of the adapter segment 800. FIG. 8B is a cutaway view of the adapter segment 800. The adapter segment 800 is an enclosure 802 configured to fasten the end segment of each speaker with batched cones 700 to each other. The adapter 800 has an opening 820 that couples towards the resonant volume and an opening 826 that couples towards a respective resonance volume, either the first or the second resonance volume, to avoid acoustic short circuit.

Figure 9:
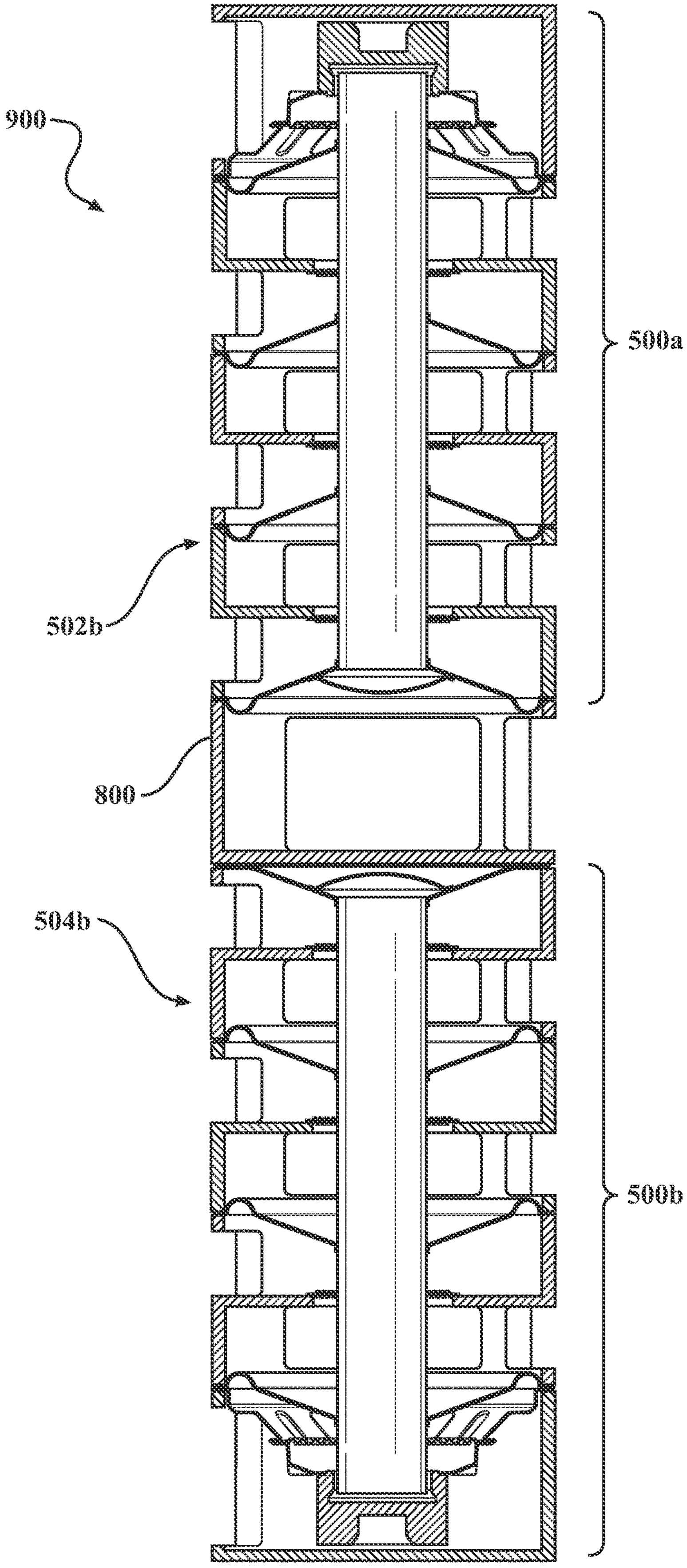
FIG. 9 is a cutaway view of one or more embodiments having two scalable speakers with batched cones.

FIG. 9 is a perspective view of one or more embodiments showing two speaker with batched cones assemblies 500*a* and 500*b* joined by the adapter segment 800 to create a dual-core speaker with batched cones assembly 900. FIG. 9B is a cutaway view of the dual-core speaker with batched cones 900. A passive end 502*b* of the first speaker with batched cones 500*a* is joined with the passive end 504*b* of the second speaker with batched cones 500*b* at the adapter segment 800.

Figure 10:
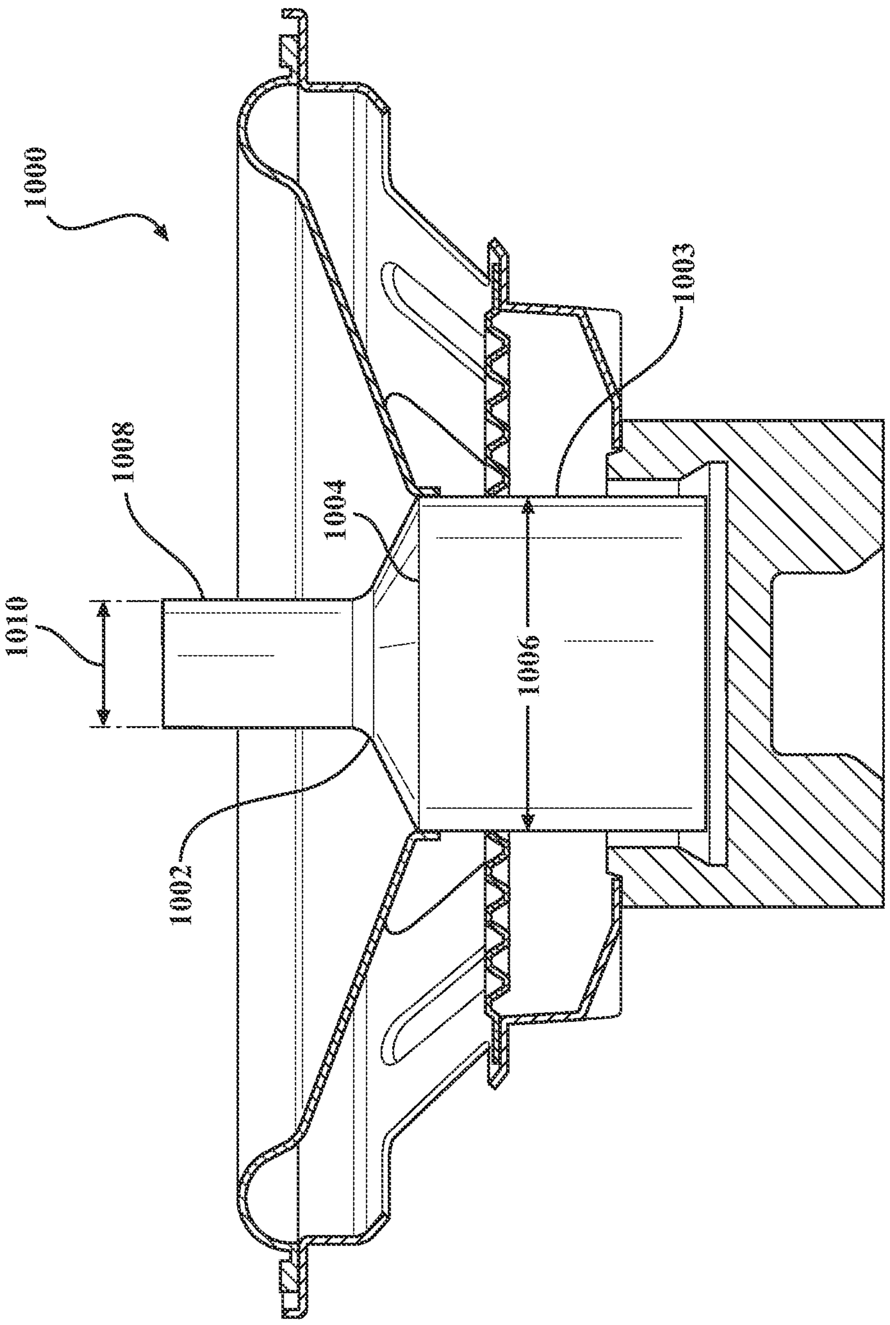
FIG. 10 is one or more embodiments of the base segment having a reduced diameter carrier tube, or push-rod.

FIG. 10 is a cutaway view of one or more embodiments of a base segment 1000 having a carrier tube 1002, with a diameter that, ideally but not limited to, may be smaller than or equal to a diameter 1006 of the voice coil 1003 driving the active unit. For example, a first end 1004 of the carrier tube 1002 has a first diameter 1006 that is approximately as large as the diameter 1006 of the voice coil 1003 to ensure high performance of the motor. A second end 1008 of the carrier tube 1002 has a second diameter 1010 that may be smaller than the first diameter 1006 to allow a larger cone surface contributing to the effective overall cone area of the whole assembly.

Figure 11:
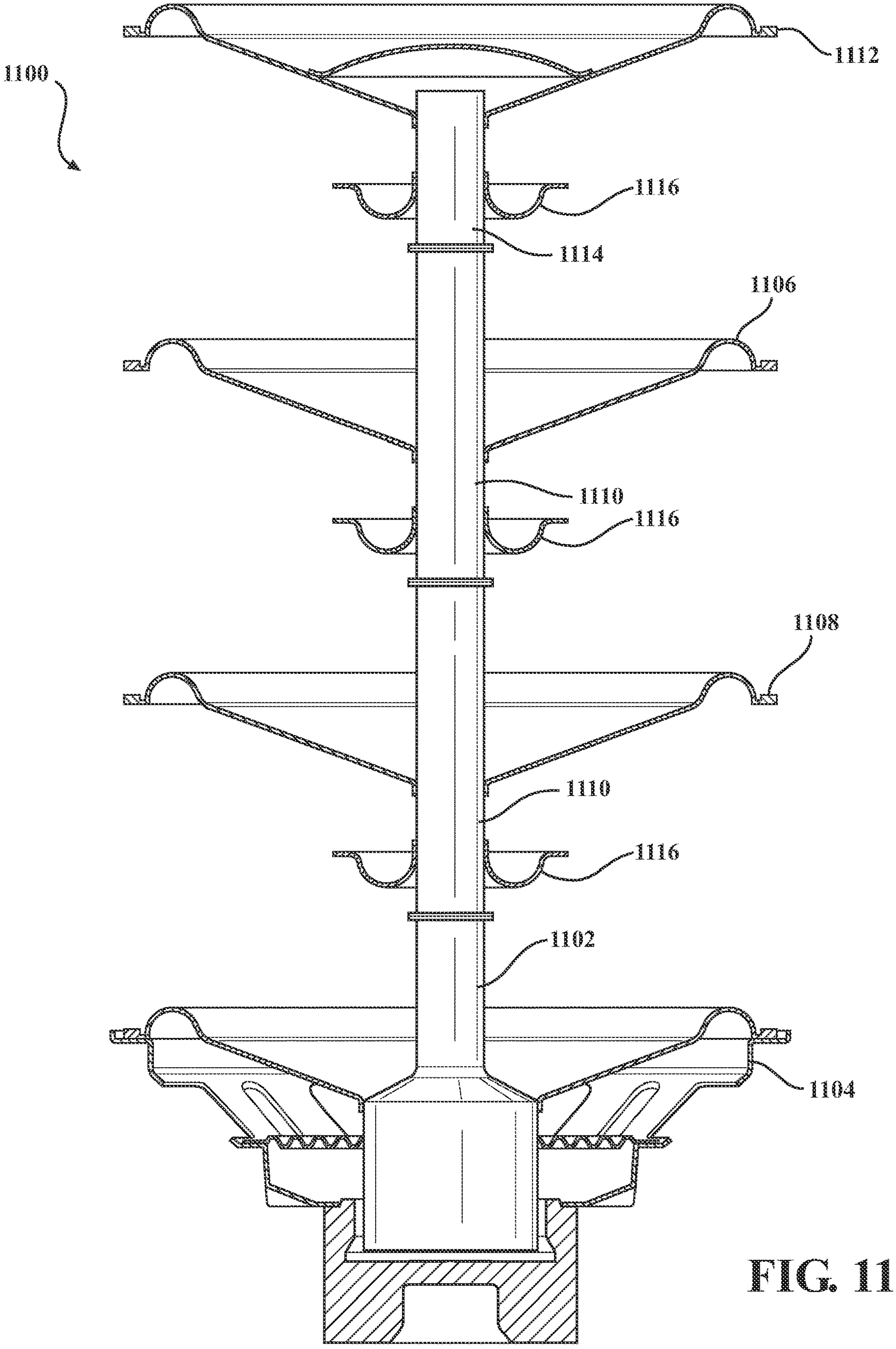
FIG. 11 is a cutaway view of one or more embodiments of a base segment, two batch segments, and an end segment having a reduced diameter carrier tube, or push rod.

FIG. 11 is a cutaway view of one or more embodiments of a speaker with batched cones 1100*a* having the reduced diameter carrier tube 1102 at a base segment 1104 discussed in FIG. 10. Each batch segment 1106, 1108 has a carrier tube 1110 with a diameter that matches the reduced diameter of the carrier tube 1102 of the base segment. The end unit 1112 has a carrier tube 1114 with a diameter that matches the diameter of the carrier tube 1110 of the batch segments 1106, 1108. Inner surrounds 1116 may be added to the carrier tube of the batch segments 1106 to provide more overall effective cone surface.

In one or more embodiments, the speaker with batched cones does not have additional push rod or carrier tube elements. See for example the cutaway view shown in FIG. 7B. An extended voice coil in the base segment 200 upon which additional batched cones, surrounds or spiders may be attached directly. It should be noted that a combination is also possible in which a single push rod, or carrier tube, extends from the voice coil in the base segment 200 through the additional segments, batched cones, surrounds or spiders.

Figure 12:
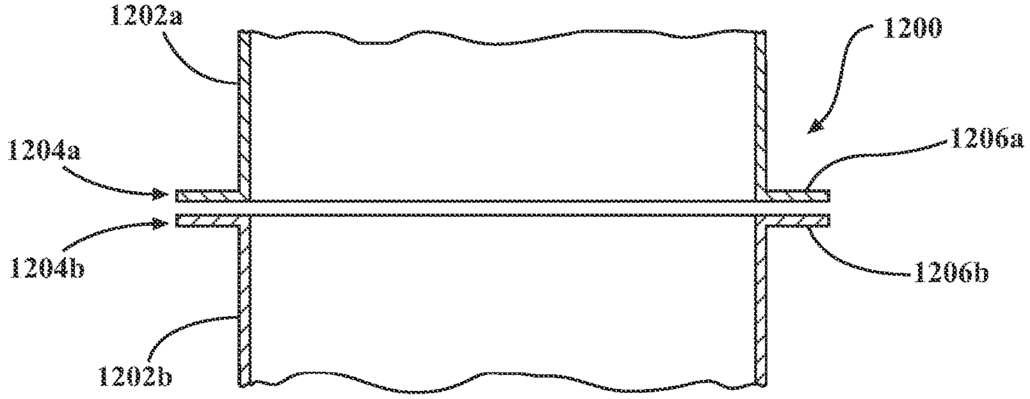
FIG. 12 is cutaway view of an arrangement of carrier tubes, or push rods, from adjacent segments.

For one or more embodiments that have carrier tubes having multiple components, there are several alternatives for connecting the carrier tube components. For example, FIG. 12 shows a cutaway exploded view of one or more embodiments of an arrangement 1200 for connecting carrier tubes 1202*a*, 1202*b* between segments. A mating end 1204*a* of a first carrier tube 1202*a* has a flange 1206*a* that extends perpendicular to the carrier tube around an outer circumference of the carrier tube 1202*a*. A mating end 1204*b* of a second carrier tube 1202*b* has a flange 1206*b* that extends perpendicular to the second carrier tube 1202*b* around an outer circumference of the second carrier tube 126*b* such that the mating ends 1204*a*, 1204*b* of the carrier tubes 1202*a*, 1202*b* abut each other when assembled and meet circumferentially at the flanges 1206*a*, 1206*b*. The mating ends may be glued at the flanges 1206*a*, 1206*b*.

Figure 13:
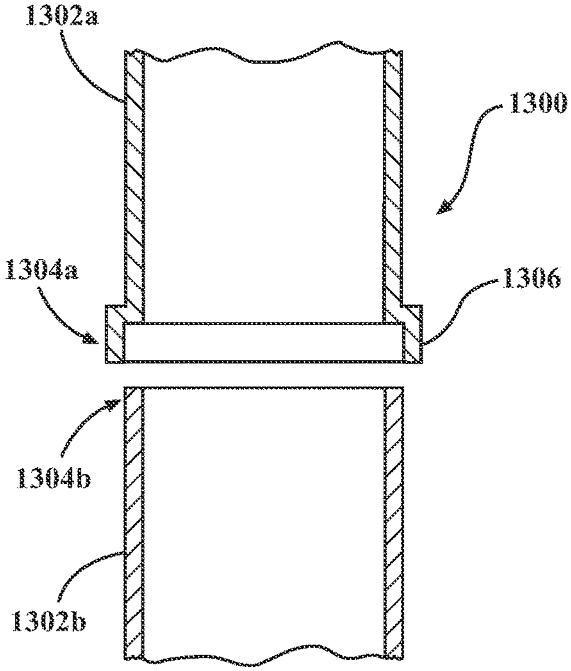
FIG. 13 is a cutaway view of an arrangement of carrier tubes, or push rods, from adjacent segments.

FIG. 13 shows a cutaway exploded view of one or more embodiments of an arrangement 1300 for connecting carrier tubes 1302*a*, 1302*b* between segments. A mating end 1304*a* of the carrier tube 1302*a* has a circumferential collar 1306. The collar 1306 has an inner diameter that receives an outer diameter of a mating end 1304*b* of the carrier tube 1302*b*. The connection may be reinforced by gluing the carrier tubes 1302*a*, 1302*b*, at the connection.

Figure 14:
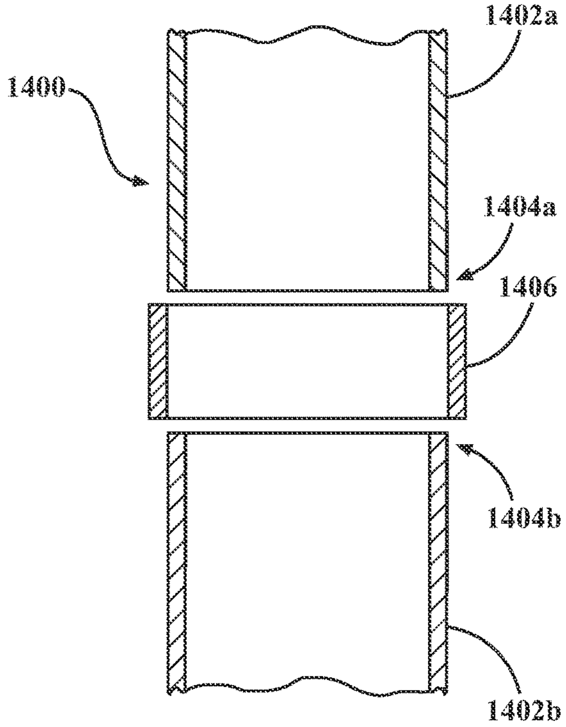
FIG. 14 is a cutaway view of an arrangement of carrier tubes, or push rods, from adjacent segments.

FIG. 14 shows a cutaway exploded view of one or more embodiments of an arrangement 1400 for connecting carrier tubes 1402*a*, 1402*b* between segments at mating ends 1404*a* and 1404*b* of the carrier tubes 1402*a*, 1402*b*. The mating ends 1404 of each carrier tube 1402*a*, 1402*b* abut each other coaxially, and may be glued. A support ring 1406 is externally coupled to an outer diameter of each of the carrier tubes 1402*a*, 1402*b*. The support ring 1406 may be glued to an outer perimeter of the carrier tubes at their respective mating ends 1404*a*, 1404*b*.

Figure 15:
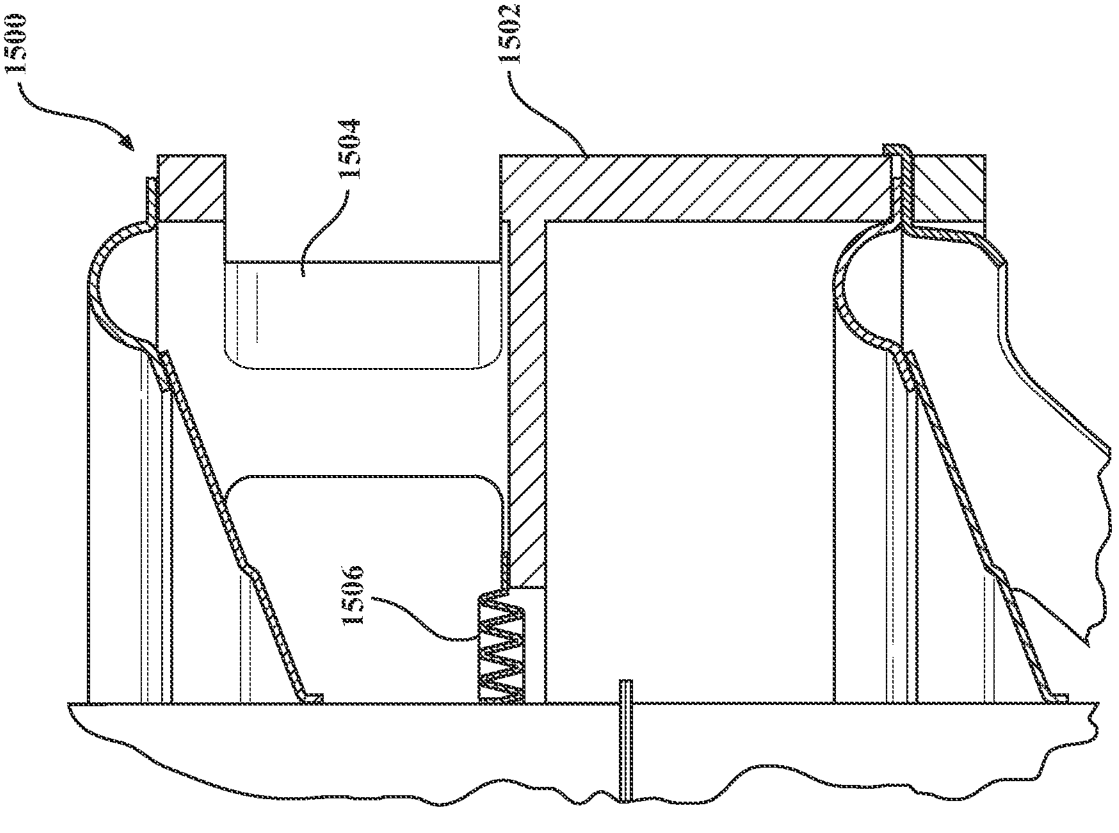
FIG. 15 is a cutaway view of one or more embodiments of a batch segment, or end segment, having a spider centering and/or holding the push rod or elongated voice coil.

It should be noted that the batch segments may have a spider instead of a surround as shown in FIG. 15. FIG. 15 shows a cutaway view of a portion of a base segment 1502 and a batch segment 1504 of a speaker with batched cones assembly 1500. The batch segment 1504 has a spider 1506 centered by the carrier tube and affixed to the batch segment enclosure 1506. A surround 1508 is at the top of the batch segment enclosure.

Figure 16:
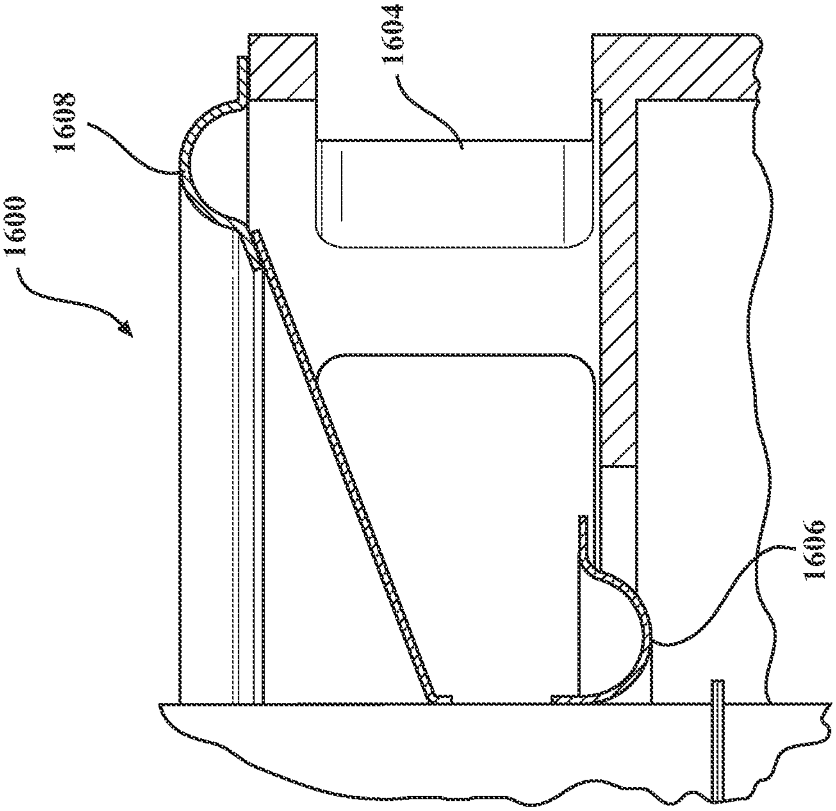
FIG. 16 is a cutaway view of one or more embodiments of a batch segment, or end segment, having a surround centering and/or holding the push rod or elongated voice coil.

FIG. 16 show a cutaway view of a base segment 1602 and a batch segment 1604 of a speaker with batched cones assembly 1600. The batch segment 1604 has a surround 1606 affixed to the bottom of the enclosure and a surround 1608 at the top of the enclosure. In the embodiment shown in FIG. 16, the surround 1606 is in an opposite direction of the surround 1608. It should be noted that it is possible for both the surround 1606 and 1608 to have the same direction. The surround geometry serves to separate the back and front sides of the radiating area to avoid acoustic short and air vent noise. The surround may also serve as an additional guiding feature to control the direction of the carrier tube/push rod. The geometry of the surround described herein is for example purposes and it should be noted that other elements may also achieve acoustic separation. For example, a foam surrounding.

The speaker with batched cones assembly of the inventive subject matter is very easily scalable based on performance requirements, packaging requirements, while maintaining small packaging.

In the foregoing specification, the present disclosure has been described with reference to specific exemplary embodiments. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order, may be executed repeatedly, and are not limited to the specific order presented in the claims. Additionally, the components and/or elements recited in any apparatus claims may be assembled or otherwise operationally configured in a variety of permutations and are accordingly not limited to the specific configuration recited in the claims. Any method or process described may be carried out by executing instructions with one or more devices, such as a processor or controller, memory (including non-transitory), sensors, network interfaces, antennas, switches, actuators to name just a few examples.

Benefits, other advantages, and solutions to problems have been described above about particular embodiments; however, any benefit, advantage, solution to problem or any element that may cause any particular benefit, advantage or solution to occur or to become more pronounced are not to be construed as critical, required or essential features or components of any or all the claims.

The terms "comprise," "comprises", "comprising", "having", "including", "includes" or any variation thereof, are intended to reference a non-exclusive inclusion, such that a process, method, article, composition, or apparatus that comprises a list of elements does not include only those elements recited but may also include other elements not expressly listed or inherent to such process, method, article, composition, or apparatus. Other combinations and/or modifications of the above-described structures, arrangements, applications, proportions, elements, materials, or components used in the practice of the present disclosure, in addition to those not specifically recited, may be varied, or otherwise particularly adapted to specific environments, manufacturing specifications, design parameters or other operating requirements without departing from the general principles of the same.

What is claimed is:

1. A speaker assembly, comprising:

a base segment enclosure having a motor, a voice coil, and a carrier tube, a first end of the carrier tube rests above the motor, the carrier tube passes through and supports the voice coil, the base segment enclosure has a first opening in a first direction toward a resonant volume and a second opening in a second direction different than the first direction;

at least one batch segment enclosure having a cone and a carrier tube, a first end of the carrier tube of an adjacent batch segment enclosure passes through the cone and aligns with the second carrier tube of the base segment enclosure, each batch segment enclosure has a first opening in the first direction and a second opening in the second direction, wherein the first opening in the base segment enclosure aligns with the first opening in each batch segment enclosure and the second opening in the base segment enclosure aligns with the second opening in each batch segment enclosure;

an end segment enclosure having a cone and a carrier tube, the carrier tube of the end segment enclosure passes through and centers the cone, a first end of the carrier tube of the end segment enclosure aligns with a second end of the carrier tube of the at least one batch segment enclosure, a dust cap is attached to a second end of the carrier tube of the end segment;

the base segment enclosure connects to the at least one batch segment enclosure; and the at least one batch segment enclosure connects to the end segment enclosure.

2. The assembly as claimed in claim 1, further comprising a plurality of batch segment enclosures arranged between the base segment enclosure and the end segment enclosure, the first end of the carrier tube of a first batch segment enclosure in the at least one batch segment enclosures aligns with the second end of the carrier tube of the base segment enclosure, the second end of the carrier tube of a last batch segment enclosure in the plurality of batch segment enclosures aligns with the first end of the carrier tube of the end segment enclosure, thereby defining a first speaker with batched cones assembly.

3. The assembly as claimed in claim 2, wherein a first speaker with batched cone assembly is aligned in parallel adjacent to at least one additional first speaker with batched cone assembly.

4. The assembly as claimed in claim 2, further comprising at least a second speaker with batched cones assembly having a predetermined number of batch segment enclosures arranged between the base segment enclosure and the end segment enclosure, the first end of the carrier tube of a first batch segment enclosure in the plurality of batch segment enclosures aligns with the second end of the carrier tube of the base segment enclosure, the second end of the carrier tube of a last batch segment enclosure in the plurality of batch segment enclosures aligns with the first end of the carrier tube of the end segment enclosure; and an adapter segment joining the end segment enclosure of the first speaker with batched cones assembly to the end segment enclosure of the second speaker with batched cones assembly thereby defining a dual-core speaker with batched cones.

5. The assembly as claimed in claim 4, further comprising a plurality of dual-core speakers with batched cones arranged in parallel.

6. The assembly as claimed in claim 4, further comprising a plurality of dual-core speakers with batched cones arranged linearly.

7. The assembly as claimed in claim 1, wherein the carrier tube of the base segment enclosure has a first diameter at the first end and a second diameter at the second end, the second diameter is less than the first diameter.

8. The assembly as claimed in claim 1, wherein the carrier tube of the base segment enclosure, the carrier tube of the batch segment enclosure, and the carrier tube of the end segment enclosure pass through a center of the base segment enclosure, a center of the at least one batch segment enclosure, and a center of the end segment enclosure; and the cone in each batch segment enclosure is connected to the carrier tube in each batch segment enclosure.

9. The assembly as claimed in claim 8, further comprising:

at least a second speaker with batched cones assembly having a predetermined number of batch segment enclosures arranged between the base segment enclosure and the end segment enclosure, the first end of the carrier tube of a first batch segment enclosure in the plurality of batch segment enclosures aligns with the second end of the carrier tube of the base segment enclosure, the second end of the carrier tube of a last batch segment enclosure in the plurality of batch segment enclosures aligns with the first end of the carrier tube of the end segment enclosure;

an adapter segment joining the end segment enclosure of the first speaker with batched cones assembly to the end segment enclosure of the second speaker with batched cones assembly thereby defining a dual-core speaker with batched cones.

* * * * *